US 8,261,261 B2
(10) Patent No.: US 8,261,261 B2
(45) Date of Patent: Sep. 4, 2012

(12) United States Patent
Tseng

(54) INSTALLING A COMPUTER PROGRAM

(75) Inventor: Erick Tseng, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 12/913,967

(22) Filed: Oct. 28, 2010

(65) Prior Publication Data

US 2012/0054735 A1  Mar. 1, 2012

Related U.S. Application Data

(60) Provisional application No. 61/379,080, filed on Sep. 1, 2010.

(51) Int. Cl.
G06F 9/445 (2006.01)
(52) U.S. Cl. ........................................................ 717/177
(58) Field of Classification Search .................... None
See application file for complete search history.

(56) References Cited

U.S. PATENT DOCUMENTS

| | | | |
|---|---|---|---|
| 5,302,947 A | 4/1994 | Fuller et al. | |
| 6,701,521 B1* | 3/2004 | McLlroy et al. | 717/173 |
| 2003/0078036 A1 | 4/2003 | Chang et al. | |
| 2004/0003389 A1* | 1/2004 | Reynar et al. | 717/178 |
| 2004/0154014 A1 | 8/2004 | Bunger | |
| 2008/0244106 A1* | 10/2008 | Kadota | 710/13 |
| 2009/0282088 A1* | 11/2009 | Thomas et al. | 707/201 |
| 2010/0109868 A1* | 5/2010 | Berger et al. | 340/540 |
| 2010/0293541 A1* | 11/2010 | Pall et al. | 717/178 |

FOREIGN PATENT DOCUMENTS

GB  2444305  6/2008

OTHER PUBLICATIONS

"Amazon.com: Customer Reviews: TomTom XL 340S 4.3-Inch Portable GPS Navigator", retrieved from http://www.amazon.com/TomTom-340S-4-3-Inch-Portable-Navigator/product-reviews/B001VEJEGK/ref=dp_top_cm_cr_acr_txt?ie=UTF8&showViewpoints=1 on Dec. 29, 2011.*
"TomTom One/XL/XXL", http://download.tomtom.com/open/manuals/xl40/manual.htm on Dec. 29, 2011.*
"PortableApps.com Suite and PortableApps.com Platform", [online] Retrieved from the Internet: <URL: http://portableapps.com/suite>, (May 2010), downloaded Mar. 23, 2011.
"How to Run Software Directly Off a USB Flash Drive", from WikiHow [online] Retrieved from the Internet: <URL: http://www.wikihow.com/Run-Software-Directly-Off-a-USB-Flash-Drive>,(circa 2005), downloaded Mar. 23, 2011.
"PalmNet—Use your Palm PDA as a Wireless Modem for your PC", [online] Retrieved from the Internet: <URL: http://web.archive.org/web/20030408174411/www.junefabrics.com/palmnet/>, ( © 2003), (circa 2008), downloaded Mar. 23, 2011.

(Continued)

Primary Examiner — Philip Wang
(74) Attorney, Agent, or Firm — Fish & Richardson P.C.

(57) ABSTRACT

An electronic mobile communication device is configured to install a computer program onto a computing device that is different than the mobile communication device. The installation process includes the electronic mobile computing device communicating with the computing device to obtain information for use in installing the computer program, and the electronic mobile computing device executing an installer for the computer program. The installer uses the information to install the computer program on the computing device.

31 Claims, 7 Drawing Sheets

OTHER PUBLICATIONS

"PDAnet—Nexus One/Nexus S Forum—Google Phone Forum", [online] Retrieved from the Internet: <URL: http://www.nexusoneforum.net/forum/nexus-one-application-discussion/1551-pdanet.html>, (Jan. 27, 2010), downloaded Mar. 23, 2011.

"Pegtop PStart", Pegtop Software / pegtop.net, [online] Retrieved from the Internet: <URL: http://www.pegtop.net/start/>, (© 2007), downloaded on Mar. 23, 2011.

"PdaNet—USB Tether/Bluetooth DUN for Android", June Fabrics Technology Group, [online] Retrieved from the Internet: <URL: http://www.junefabrics.com/android/>, (circa Aug. 2010), downloaded Mar. 23, 2011.

"WM5torage v1.9 freeware for smartphone, Windows mobile phone free downloads", [online] Retrieved from the Internet: <URL: http://www.smartphone-freeware.com/download-wm5torage-v1-8.html>, (circa Apr. 2009), downloaded Mar. 23, 2011.

"HTC Sync upgrade (V2.0.8) for HTC Magic, Hero & Tattoo", [online] Retrieved from the Internet: <URL: http://www.htc.com/www/SupportViewNews.aspx?dl_id=758&news_id=476>, (circa Nov. 2009), downloaded Mar. 23, 2011.

"Ceedo (aka. PowerToGo) Newbie Guide", [online] Retrieved from the Internet: <URL: http://www.everythingusb.com/ceedo.html>, (© 2009), downloaded Mar. 23, 2011.

"A Directory of Programs Designed for USB Drives", Loose Wire Blog, [online] Retrieved from the Internet: <URL: http://loosewire.typepad.com/blog/2005/03/a_directory_of_.html>, (Mar. 15, 2005), downloaded Mar. 23, 2011.

"How to Use a USB Flash Drive as a PC on a Stick—Bring Your Docs & Files Everywhere", Brighthub.com [online], Retrieved from the Internet: <URL: http://www.brighthub.com/office/home/articles/19045.aspx>, (Jun. 4, 2010), downloaded Mar. 23, 2011.

"Does the portable apps suite run via USB on new Nokia E90 smartphone?", Portable Apps.com [online] Retrieved from the Internet: <URL: http://portableapps.com/node/8539>, (Aug. 10, 2007), downloaded Mar. 23, 2011.

"A Flash Drive That Holds Your Computer", New York Times [online] Retrieved from the Internet: <URL: http://www.nytimes.com/2006/06/15/technology/15pogue.html?_r=1>, (Jun. 15, 2006), downloaded Mar. 23, 2011.

International Search Report and Written Opinion in Application No. PCT/US2011/049680, dated Dec. 6, 2011.

Office Action in U.S. Appl. No. 13/249,897, dated Jan. 5, 2012.

"PortableApps.com Platform and Suite Support", [online] Retrieved from the Internet: <URL: http://portableapps.com/support/portable_apps_suite>, downloaded Mar. 23, 2011 [© 2004-2001].

* cited by examiner

_(56)_

INSTALLING A COMPUTER PROGRAM

CROSS-REFERENCE TO RELATED APPLICATION

This patent application claims priority to U.S. Provisional Application No. 61/379,080, which was filed on Sep. 1, 2010. The contents of U.S. Provisional Application No. 61/379,080 are hereby incorporated by reference into this patent application as if set forth herein in full.

TECHNICAL FIELD

This patent application generally describes installation of a computer program, e.g., from a mobile communication device to a computing device.

BACKGROUND

Computer programs require installation on a computing device before they can be executed. Some computer programs can be installed simply by copying their code onto a target computer. Other computer programs, particularly those that are more complex, may use installation software. The installation software typically resides in an installation file, and includes code that is used to perform system modifications and file installations that are needed to run a particular program.

In one example, an installation file can include an installer that automates installation of a computer program. The installation process can include, among other things, unpacking files for the computer program, creating folders for the files on the target computer, storing the files in the appropriate folders, and creating desktop icon(s). An executable file is typically among the files that are installed. The executable file includes code that is run on the computer to provide the program's functionality.

SUMMARY

This document describes systems and techniques by which a mobile communication device may control the installation of software onto a computing device, such as a desktop or laptop computer, that is separate from the mobile device. The mobile communication device and the computing device may both be logged into a same account, e.g., for a particular user.

For example, described herein is a method, performed by an electronic mobile communication device, to install a computer program onto a computing device that is different than the electronic mobile communication device. The method includes communicating with the computing device to obtain information for use in installing the computer program, and executing, on the electronic mobile communication device, an installer for the computer program. The installer uses the information from the computing device to install the computer program on the computing device. The method may include any one or more of the features described herein either alone or in combination, examples of which are as follows.

The method may include identifying a communication link between the electronic mobile communication device and the computing device, and executing the installer in response to identification of the communication link. The installer may be executed automatically, without human intervention, in response to identification of the communication link.

The method may include providing a query to a user of the computing device as to whether to proceed with installation of the computer program on the computing device, and receiving a reply to the query from the user. The installer may be executed in response to the reply. The query may be a dialog. The dialog may identify the computing device as a target for installation of the computer program.

The information received from the computing device may identify one or more directories for the computer program on the computing device. The computer program may be a companion program to a program that executes on the electronic mobile communication device, a program to manage and play music files, an update to an existing computer program on the computing device, and/or a phone-centric information management computer program.

The method may include performing a security check on the computer program before installing the computer program on the computing device. The installer may be part of an installation file, which need not be copied to the computing device.

Also described herein is a method, performed by an electronic mobile communication device, to install a computer program on a computing device that is separate from the electronic mobile communication device. The method includes identifying a communication link to the computing device, and in response to identifying the communication link, automatically sending an installation file for the computer program to the computing device. The installation file may be sent to a directory identified by the computing device. The computer program may be a companion to another computer program that executes on the electronic mobile communication device. The method may include any one or more of the features described herein either alone or in combination, examples of which are as follows.

The method may include performing a security check on the computer program before sending the installation file to the computing device, and displaying an indication, on the electronic mobile computing device, that the installation file is being sent to the computing device.

All or part of the methods, systems and techniques described herein may be implemented as a computer program product that includes instructions that are stored on one or more non-transitory machine-readable storage media, and that are executable on one or more processing devices. All or part of the methods, systems and techniques described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein is a system for installing a computer program on a computing device, such as a personal computer (PC), using a mobile communication device (or simply "mobile device"), such as a mobile telephone. The mobile device may itself include a computing device, and may be in the form of a smartphone, or application ("app") phone. Though the mobile device includes a computer, the description here generally uses the term "computer" to describe the computer onto which the software is installed by using the mobile device. The system may be used to install a program that is for use on the computer only, or to install a computer-side companion to a mobile application. For example, a computer program may include a mobile app for playing music and a companion desktop application. The mobile application may be installed on the mobile device, and the desktop application may be installed from the mobile device to a computer.

Briefly, the installation process may involve software on the mobile device that communicates with software on the computer to obtain information, e.g., about where on the computer to install the computer program. The software on the mobile device executes an installer for the computer program to control installation of the computer program on the computer. The installer uses the information obtained from the computer to perform the installation. In an implementation, the installation process may be performed on a mobile communication device and a computing device that are both logged onto a same system account, e.g., for a particular user. However, the installation process is not limited to this type of use.

Figure 1:
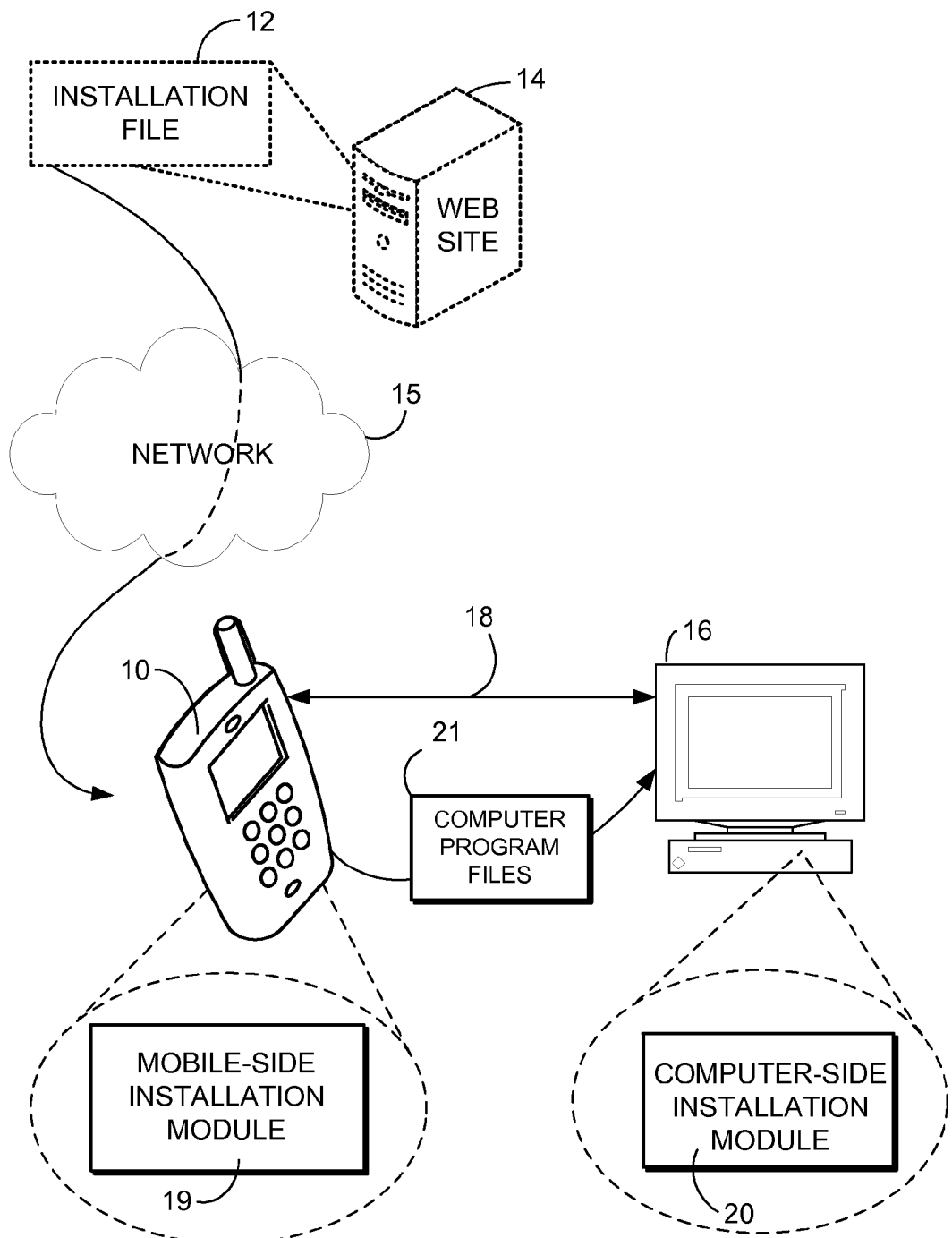
FIG. 1 is a conceptual view of a process for installing a computer program from a mobile device.

FIG. 1 is a conceptual view of the above process for installing a computer program from a mobile device to a computer. In this regard, an installation file for the computer program may be pre-stored on mobile device 10, e.g., in conjunction with its manufacture or distribution. For example, mobile device 10 may come pre-loaded with music software or a Web browser for a computer. Alternatively, installation file 12 may be downloaded from a Web site 14 over a network 15. Web site 14 and installation file 12 are drawn using dotted lines to indicate that they are but one example of how the installation file may be obtained. Installation file 12 may be stored in memory on mobile device 10. For example, the installation file may be stored on an SD (Secure Digital) card in the mobile device.

Mobile device 10 and computer 16 each contain software for coordinating installation of the computer program from mobile device 10 to the computer 16. To this end, mobile device 10 may include mobile-side installation module (MSIM) 19 and computer 16 may include computer-side installation module (CSIM) 20. In an example operation, MSIM 19 detects a connection between mobile device 10 and computer 16. Any appropriate wired or wireless connection may be detected. After detecting the connection, MSIM 19 communicates 18 with CSIM 20 to identify, e.g., where on computer 16 the computer program should be installed. With this information, MSIM 19 proceeds with installation of the computer program 21 onto computer 16. For example, MSIM 19 may automatically execute an installer associated with (and provided with) the installation file, and may instruct the installer where to install the computer program on computer 16. The installer may proceed with a typical installation on computer 16.

Figure 2:
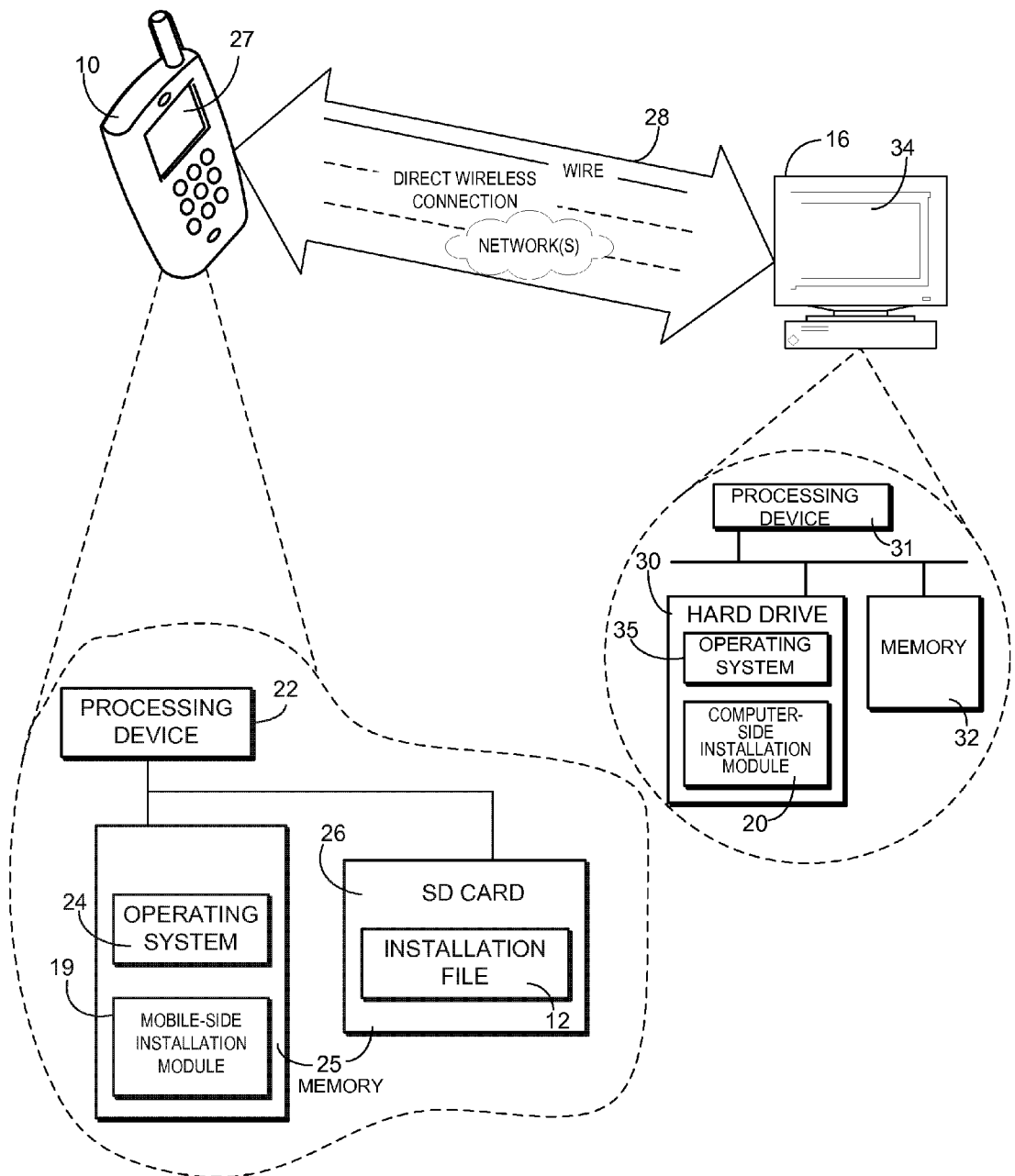
FIG. 2 is a block diagram of an example of a system on which the computer program installation process of FIG. 1 may be implemented.

FIG. 2 shows an example of a system on which the computer program installation process described herein may be implemented. The system includes mobile device 10 and computer 16. Mobile device 10 may be a smartphone; however, the installation processes may be implemented using any appropriate mobile communication device. Generally speaking, a smartphone is a mobile device that offers advanced computing capabilities, such as the ability to execute applications and to communicate with computer 16 or other appropriate computing device.

As also described below, mobile device 10 includes a processing device 22, such as a microprocessor, that runs an operating system (OS) 24, and that also is capable of running multiple apps. Mobile device 10 includes memory 25, that may include one or more of an SD card 26, random access memory (RAM), and programmable read-only memory (PROM). Memory 25 stores operating system (OS) 24 and apps for the mobile device, along with other computer programs and information, such as a user's contact list and other telephone-related information.

Mobile device 10 includes a display screen 27, that may be a liquid crystal display (LCD). Display screen 27 may be touch-sensitive, allowing a user to enter information onto the display screen via a virtual keyboard. Alternatively or in addition, a physical QWERTY keyboard and scroll wheel may be provided for entering information that is then displayed on the display screen. Mobile device 10, and apps stored thereon, may also be configured to accept voice commands, and to perform functions in response to such commands. For example, the computer program installation processes described herein may be initiated and controlled via voice commands.

Mobile device 10 is capable of establishing a connection 28 to computer 16, over which communications may be sent. To this end, mobile device 10 may include port(s) that enable direct wired connection to other devices, including computer 16. Examples of such ports include USB (Universal Serial Bus) and FIREWIRE ports. Mobile device 10 may also be capable of direct wireless connection to other devices, including computer 16. For example, mobile device 10 may be BLUETOOTH-capable. Mobile device 10 may also be configured to support WI-FI, 3 G and 4 G wireless connections, through which device-to-device connection may be achieved via intervening network(s).

Mobile device 10 stores MSIM 19, which as noted, is executable on mobile device 10 to coordinate installation of a computer program to computer 16. MSIM 19 may be pre-installed on mobile device 10 (e.g., in conjunction with its manufacture or distribution). Alternatively, MSIM may be downloaded from a Web site or installed on mobile device 10 via computer 16. MSIM 19 runs in cooperation with its counterpart, CSIM 20, in order to identify a connection between mobile device 10, to obtain installation information from the computer including, e.g., where on computer 16 a computer program is to be installed, and to control an installer running on mobile device 10 so that the computer program is installed on computer 16. This process is described in more detail below with respect to FIG. 3.

Computer 16 may be a desktop, a laptop, a tablet or any other appropriate computing device. Computer 16 includes a hard drive 30 for storing data and computer programs, and a processing device 31 (e.g., a microprocessor) and memory 32 (e.g., RAM) for executing computer programs. A display 34, such as an LCD or a CRT (Cathode Ray Tube) displays, to a user, images that are generated by computer 16, including the dialogs described below.

Computer 16 runs an operating system 35, such as a version of MICROSOFT WINDOWS. Computer programs, including applications, are installed onto computer 16, and execute on top of the operating system. Among these computer programs is CSIM 20 which, together with MSIM 19, enables installation of a computer program from mobile device 10 to computer 16.

Other examples of a mobile device and a computer on which the installation processes described herein may be implemented are provided below.

Figure 3:
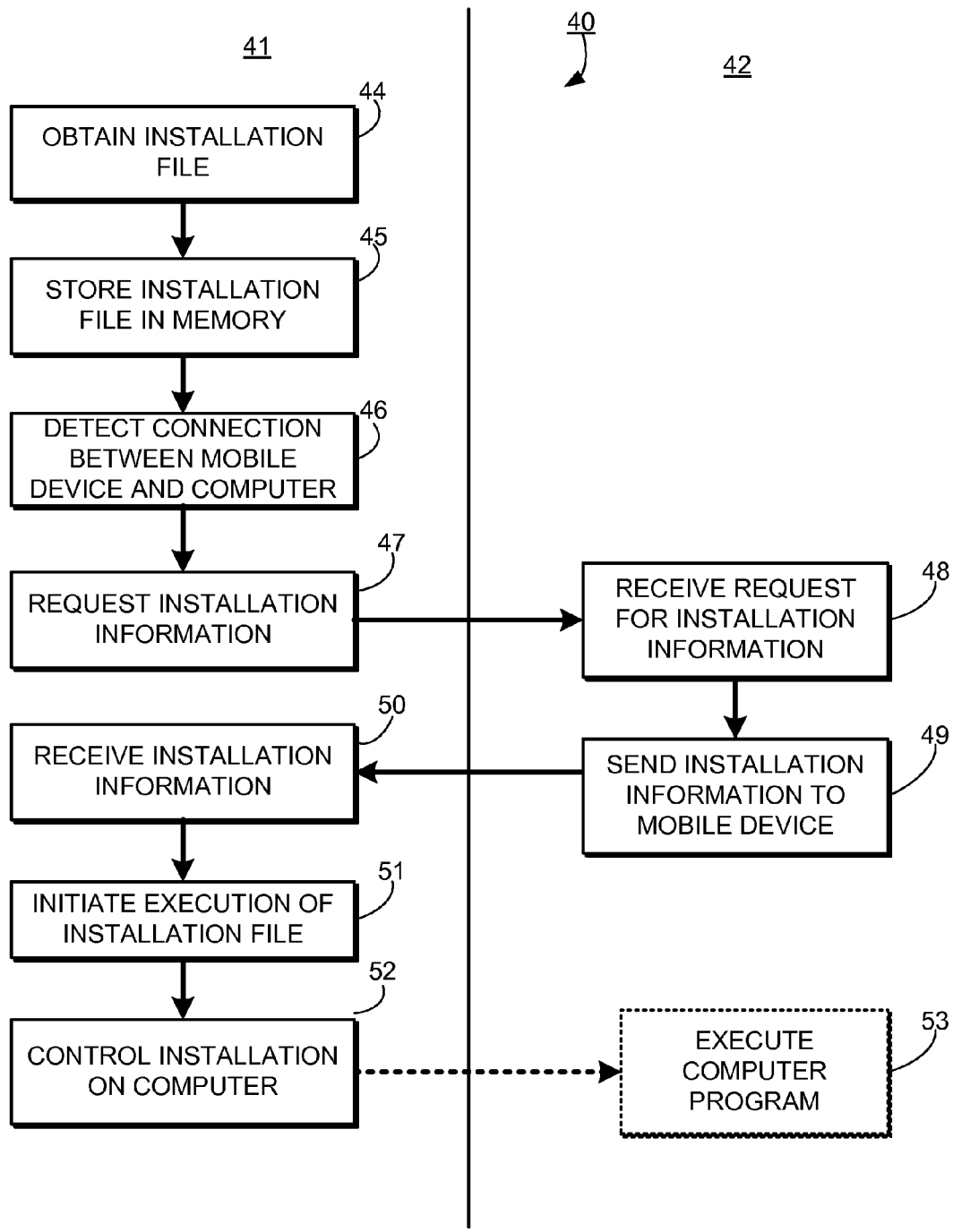
FIG. 3 is a flowchart showing a process, which may be performed on the system of FIG. 2, for installing a computer program on a computer from a mobile device.

FIG. 3 is a flowchart showing a process 40, which may be performed on the system of FIG. 2, for installing a computer program on a computer, such as computer 16, from a mobile device, such as mobile device 10. In FIG. 3, process 40 is split into a left part 41, which is performed by mobile device 10, and a right part 42, which is performed by computer 16. It is noted, however, that the actions shown in FIG. 3 may be assigned differently. For example, actions performed by mobile device 10 may be performed by computer 16, and vice versa Referring to FIG. 3, mobile device 10 obtains (44) an installation file 12 (see FIG. 1) for a computer program. The installation file may be pre-loaded onto the mobile device or it may be obtained from a third party. For example, the installation file may be downloaded to the mobile device wirelessly from a Web site, e.g., over a Wi-Fi® or 3 G network. The installation file is stored (45) in memory on mobile device 10. For example, the installation file may be stored in the mobile device's SD card 26. The installation file may include compressed files that make up, and are used by, the computer program. Examples of such files include an executable, drivers, plug-ins, and definition files. The installation file also includes an installer. The installer is itself a computer program, which is executable to install the computer program that is the subject of the installation file. The installer may be executable in a windowing environment via the installation file, e.g., simply be executing the installation file. The installer may include instructions for creating directories on a computer to which the computer program is installed, instructions to modify the OS (e.g., the WINDOWS registry) of the computer to install the executable, configuration file entries that define an initial configuration of the computer program, and links or shortcuts for interfacing to the executable.

As part of process 40 for installing the computer program onto computer 16, mobile device 10 connects to the computer. The connection may be wired, e.g., USB or FIREWIRE, or wireless, e.g., BLUETOOTH or WI-FI. MSIM 19 detects (46) the connection to computer 16. For example, MSIM 10 may detect a physical connection and/or a "handshake" that occurs between computer 16 and mobile device 10 to implement a wired or wireless connection.

After (e.g., in response to) detecting a connection between the mobile device and the computer, MSIM 19 and CSIM 20 exchange communications (labeled 47 to 50 in FIG. 1), thereby enabling MSIM 19 to obtain installation information from CSIM 20. For example, MSIM 19 sends a request (47) to CSIM 20 to confirm that the OS on computer 16 is compatible with the installation file on mobile device 10. In this regard, installation files for computer programs are typically operating system-specific. Accordingly, MSIM 19 and CSIM 20 may communicate, before computer program installation, to confirm that the installation file on mobile device 10 is appropriate for the OS on computer 16. In an example, if the installation file is for MICROSOFT WINDOWS and the computer is a MACINTOSH that runs a MAC OS, a different installation file may be required. CSIM 20 receives (48) the request, and responds (49). MSIM 20 then receives (50) information identifying the OS on the computer. If the installation file is not compatible with the computer's OS, then mobile device 10 may obtain another installation file that is compatible with the computer's OS. MSIM 19 and CSIM 20 may also communication to confirm that mobile device 10 and computer 16 are logged onto a same user account (or at least an account that permits modifications to the configuration of computer 16). This information may be obtained from the operating system on computer 16 or from other services running on computer 16.

Assuming OS-installation file and user-account compatibility, MSIM 19 requests (47), from CSIM 20, information about where, on computer 16, the computer program is to be installed. CSIM receives (48) this request and responds (49) with the requested information. For example, CSIM 20 may specify a directory or a memory (e.g., a hard drive) onto which the computer program is to be installed. In this regard, an installer may provide a recommendation regarding a directory where a computer program is to be installed. The information provided by CSIM 20 may be used to change that directory so that the installation target is on the computer (e.g., on its "C" drive). Other information may also be requested and received via actions 47 to 50.

Following receipt (50) of installation information from CSIM 20, MSIM initiates execution (51) of the installer on mobile device 10. Specifically, processing device 22 on mobile device 10 executes the installer associated with the installation file. In a WINDOWS context, the installation file may be, e.g., an executable (".exe") file, which includes the installer, files, and other information used to install the computer program. In this example, the installer is executable by executing the installation file.

Figure 4:
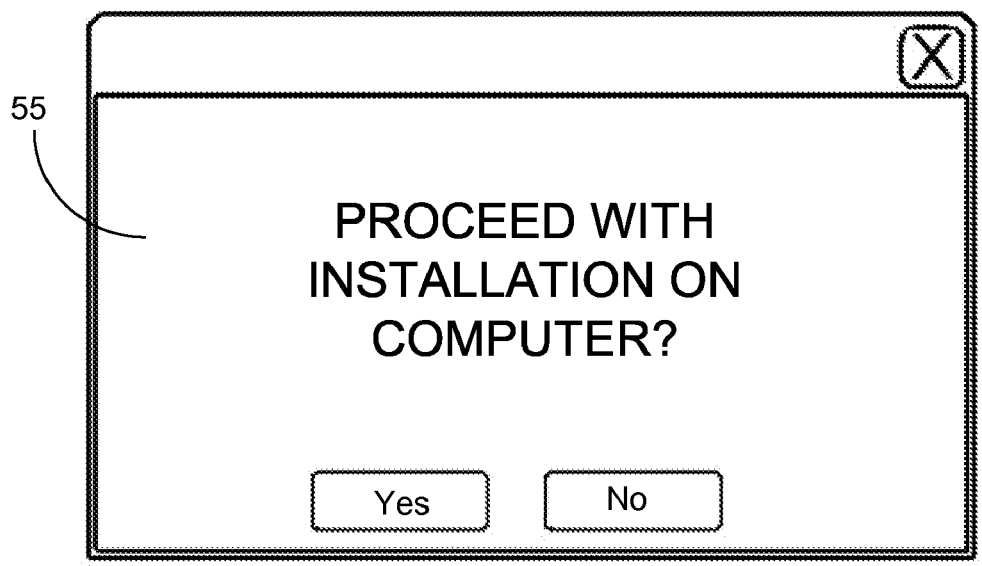
FIG. 4 shows dialog that requires a user to enter a confirmation before proceeding with computer program installation.

Execution of the installer may be performed automatically (e.g., without prompting by a user). Alternatively, process 40 may generate a dialog, and display it on the mobile device's display screen or on the computer's monitor. In this regard, FIG. 4 shows dialog 55 that requires the user to enter a confirmation before proceeding with computer program installation. The dialog may also require the user to enter additional information, such as a username and password of the mobile device and/or computer to continue with the installation.

During execution, MSIM 19 interacts with the installer for the computer program and the CSIM to control (52) installation of the computer program on computer 16. In process 40, the installation file itself is not copied to the computer. The installation process may include, but is not limited to, installing the executable for the computer program on the computer, defining directories for the computer program on the computer, installing files that contain data used by the computer program on the computer, modifying the computer's OS (e.g., the WINDOWS registry) to support the computer program, storing configuration file entries that define the initial configuration of the computer program on the computer, and creating links or shortcuts for interfacing to the executable on the computer.

After the computer program is installed on computer 16, it may be executed (53) on computer 16 automatically or interactively. In an implementation, mobile device 10 may instruct computer 16 to execute the computer program after installation. Execution is shown using dotted lines to indicate that it may not be performed in this example.

Figure 5:
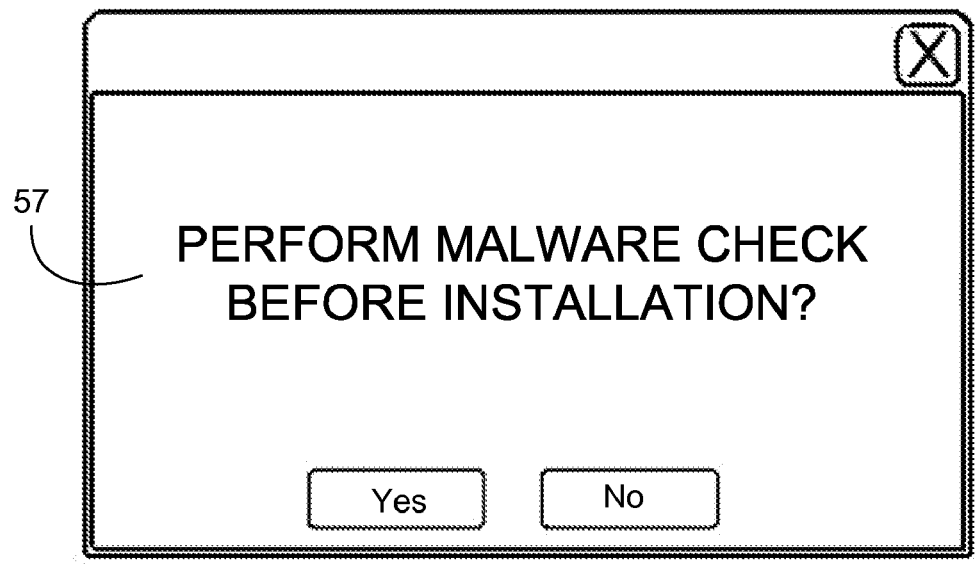
FIG. 5 shows a dialog that asks a user whether to perform a malware check prior to computer program installation.

Mobile device 10 may include security features. For example, mobile device 10 may include software to check the computer program's installation file for malware, such as computer viruses or the like. The check may be performed before installation of the computer program from the mobile device to the computer. The check may be performed automatically or it may be performed interactively, e.g., in response to user input. For example, process 40 may display a dialog. In this regard, FIG. 5 shows a dialog 57, which asks the user whether to perform a malware check prior to computer program installation. The check may then be performed only if the user requests it.

An alternative process for installing a computer program onto a computing involves identifying a communication link to a computing device and after (e.g., in response to) identifying the communication link, sending an installation file for the computer program from the mobile device to the computing device. The installation file may be sent automatically or in response to user input (e.g., via a dialog on the mobile device or computer). Unlike in process 40 of FIG. 3, the computer program installer is not executed on the mobile device. Instead, the entire installation file is sent to the computer, from which it may be executed. This alternative process may include the use of a different MSIM and CSIM, or it may be an option that is provided to a user as part of process 40 (e.g., to send the installation file to computer 16, rather than performing the installation from the mobile device itself).

In an example, an installation file may be stored on the mobile communication device (e.g., on a memory card on the device) and the mobile communication device may communicate the installation file to an installation sub-system on the computer. The installation sub-system may be programmed to automatically execute an installer in the installation file upon receiving the installation from the mobile device. As a result, the computer program is installed on the computer without a need for interaction at the computer to start the installation process (though in certain implementations, a user may be asked to intervene on the computer during the course of the installation process).

Figure 6:
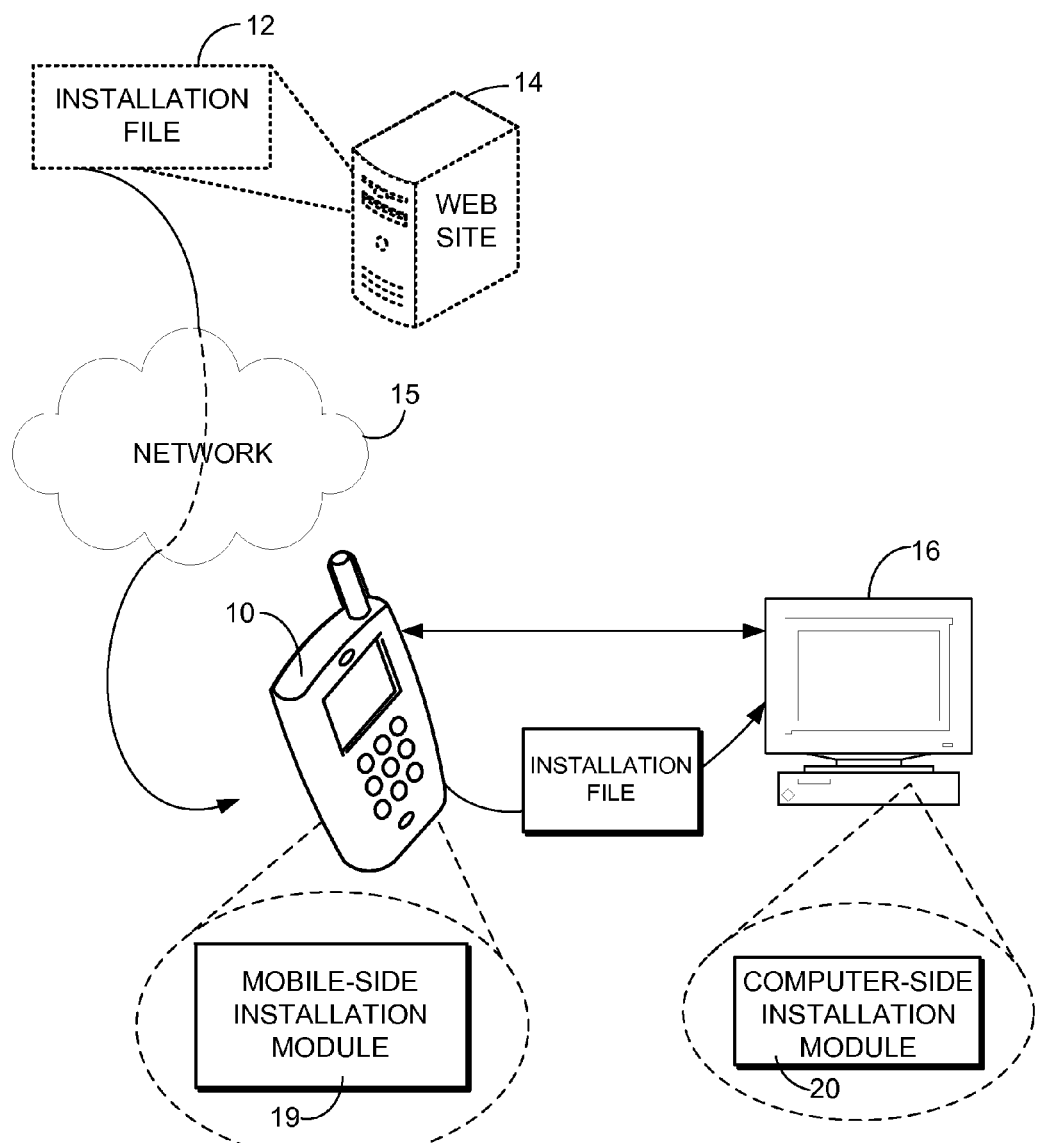
FIG. 6 is a conceptual view of a process for using a mobile device in a process for installing a computer program on a computer.

FIG. 6 is shows the foregoing installation process conceptually. More specifically, FIG. 6 is a conceptual view of a process for using mobile device in a process for installing a computer program on a computer. As shown in FIG. 6, the installation file may be pre-stored on mobile device 10, e.g., in conjunction with its manufacture or distribution. Alternatively, as shown in the dotted-line portion of FIG. 6, installation file 12 may be downloaded from a Web site 14 over a network 15. Installation file 12 may be stored in memory on mobile device 10.

Mobile device 10 and computer 16 each contain software for coordinating storage of the computer program's installation file from mobile device 10 to computer 16, e.g., MSIM 19 CSIM 20. These may include the same or different code than that used to implement process 40.

In an example operation, MSIM 19 detects a connection between mobile device 10 and computer 16. Any appropriate wired or wireless connection may be detected. In response, MSIM 19 communicates 18 with CSIM 20 to identify where (e.g., in what directory) on computer 16 the computer program should be stored. With this information, MSIM 19 stores the installation file at the appropriate location on computer 16 (e.g., its desktop).

Figure 7:
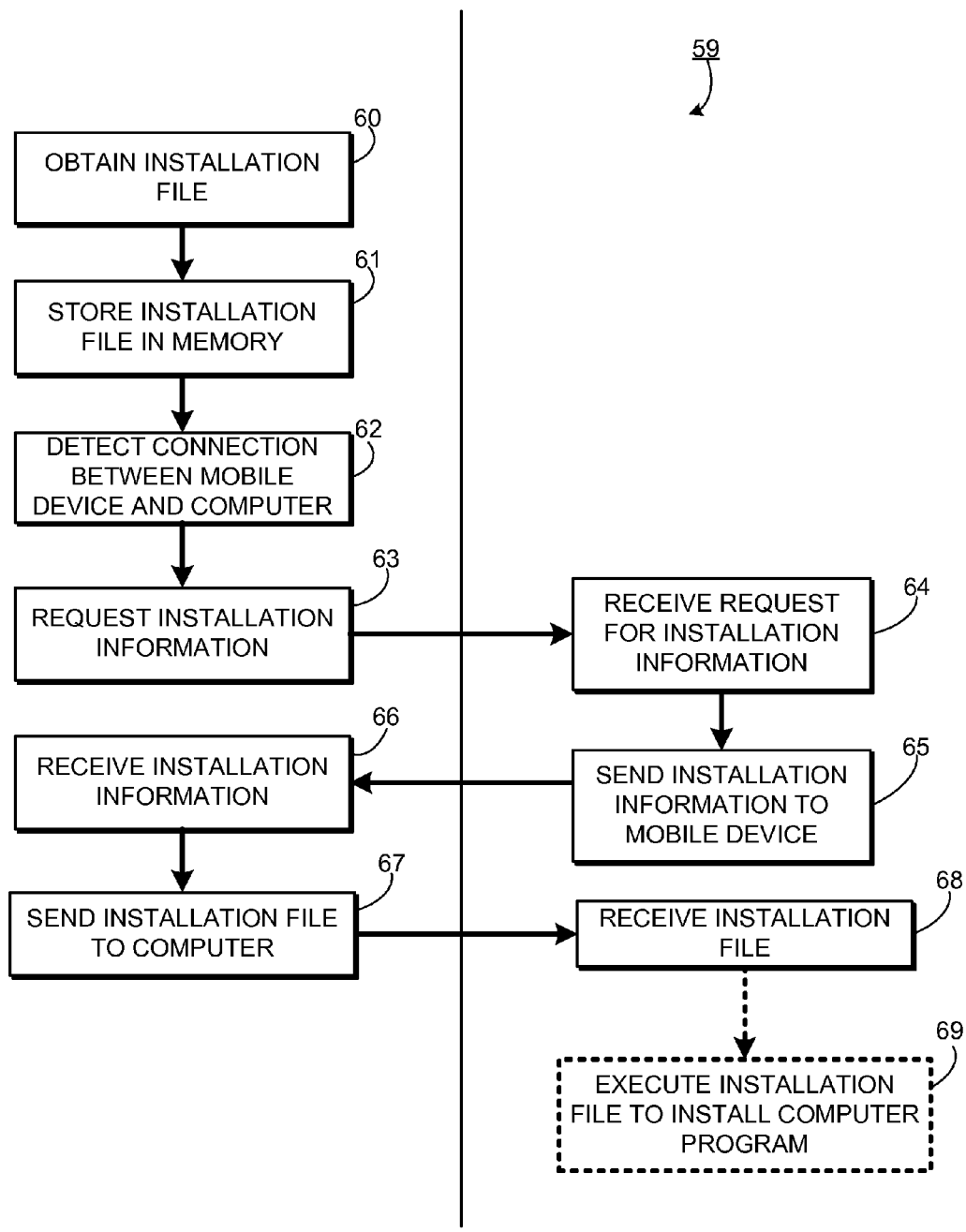
FIG. 7 is a flowchart showing a process, which may be performed on the system of FIG. 2, for sending an installation file to a computer from a mobile device.

FIG. 7 is a flowchart showing the above-described alternative process 59 for installing a computer program on a computer. More specifically, FIG. 7 is a flowchart showing a process, which may be performed on the system of FIG. 2, for sending an installation file to a computer from a mobile device. Actions 60 to 66 of process 59 may be identical to, or similar to, at least part of actions 44 to 50 of process 40 (FIG. 3). As indicated above, however, process 59 of FIG. 7 differs from process 40 in that process 49 sends the actual installation file to computer 16, rather than installing the computer program from the mobile device to the computer. Accordingly, MSIM 19 retrieves installation file 12 and sends (67) installation file 12 to a specified location on computer 16 (e.g., its desktop) that was identified by CSIM 20. Computer 16 receives (68) the installation file and may execute (69) the installation file in order to install the computer program on computer 16. The mobile device may send the computer an instruction to execute the installation file. The instruction may be sent along with the installation file, or it may be sent before or after the installation file is sent to the computer. A user may be prompted to send the instruction or the instruction may be sent to the computer without prompting. The installation file may be sent automatically from the mobile device in response to detection of the communication link to the computer. In other implementations, a user may be prompted with a dialog, which may be displayed on the mobile device, and which may request that the user confirm that the installation file is to be sent to the computer.

In any installation scenario, the mobile device may display a message on its display screen that an installation is being performed with respect to the computing device. The computing device may also display such a message.

As was the case in process 40, process 59 may include security features. For example, process 59 may include software to check the installation file for malware. The check may be performed before sending the installation file from the mobile device to the computer. The check may be performed automatically or it may be performed in response to user input, as in process 40.

As explained above, the processes described herein (e.g., processes 40, 59, and variants thereof) may be used to download, from a mobile device to a computing device, a companion to a computer program that runs on the mobile device. For example, a program for downloading, playing, and managing music files may include a component that runs on the mobile device and a component that runs on the computing device. The component that runs on the computing device (which may be a separate computer program) may be installed from the mobile device to the computing device. Other types of computer programs may also be installed from the mobile device to the computing device. For example, a Web browser program may be installed from the mobile device on to the computing device. This may be done to assist in distribution of the Web browser.

Likewise, upgrades of any existing computer programs on the computing device may be installed from the mobile device in accordance with the processes described herein. As part of the upgrading process, the MSIM may communicate with the CSIM to identify computer programs that require upgrading and/or to confirm that the mobile device upgrades are compatible with versions of computer programs on the computing device.

In other examples, phone-centric information management computer programs may be installed from the mobile device to the computing device. For example, a computer program to manage voice recordings, contacts, telephone numbers, e-mail or any information used on a phone may be installed onto the computing device from the mobile device. As was the case above, a desktop companion program to any of the above programs may also be installed onto the computing device. In another example, an image (e.g., photograph) management program may be installed from the mobile device to the computing device.

Rather than performing a complete installation from the mobile device to the computing device, the installation file of any of the computer programs described above may be transferred from the mobile device to the computing device, and the installation file may be executed on the computing device.

Figure 8:
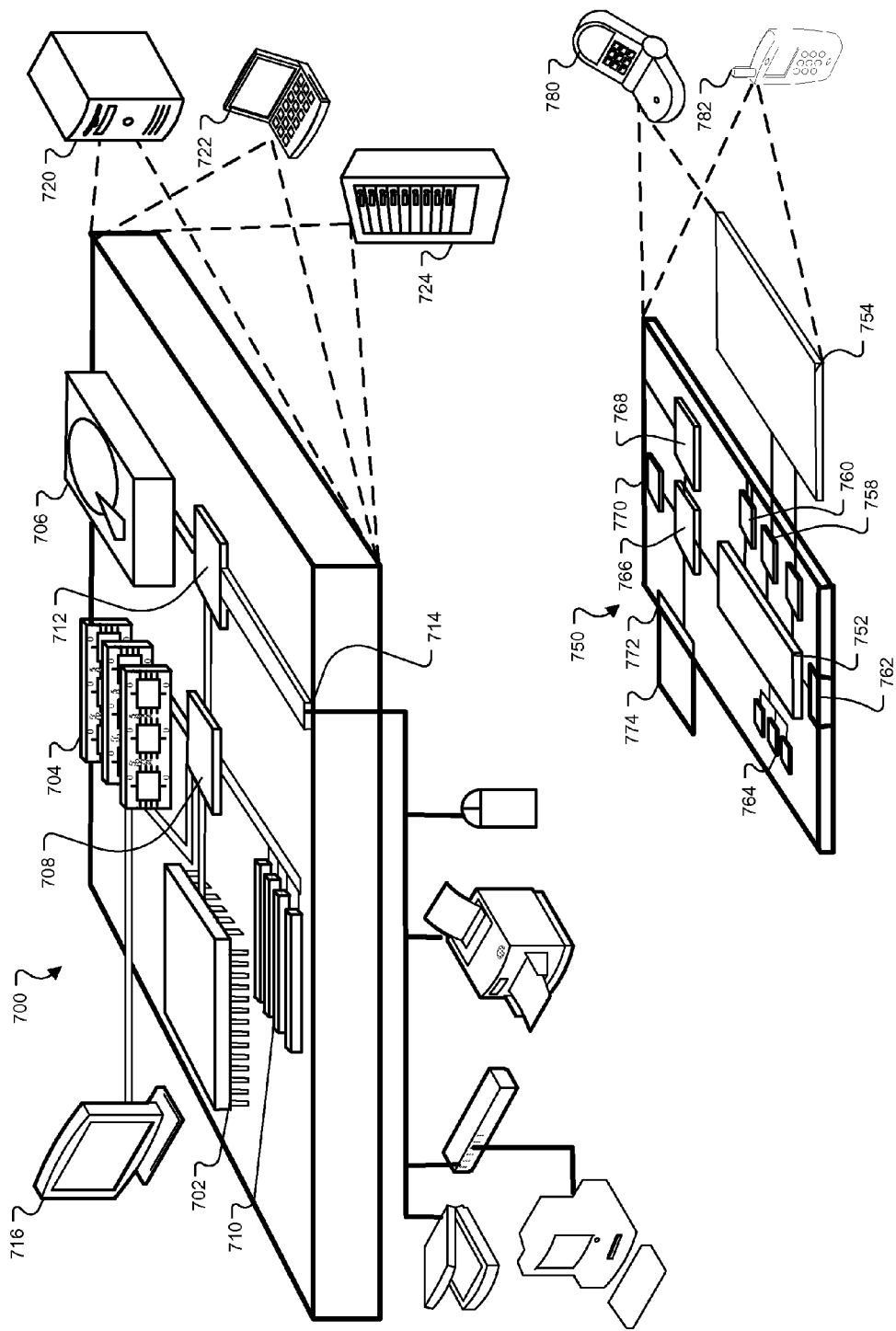
FIG. 8 shows an example of a computer device and a mobile computing device that can be used to implement the processes described herein.

FIG. 8 shows an example of a generic computer device 700 and a generic mobile computer device 750, which may be used to implement the processes described herein, including the mobile-side and server-side processes for installing a computer program from a mobile device to a computer. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable medium, such as the memory 704, the storage device 706, memory on processor 702, or a propagated signal. For example, the information carrier may be a non-transitory, machine-readable storage medium.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

The system described herein may be advantageous for installing applications from a mobile to device to a computing device, e.g., a desktop computer, that is not connected to a network (e.g., the Internet) or does not otherwise have capability to access those applications from remote locations. The system may also be advantageous in that it need not require user interaction in order to install a computer program from the mobile device to a computing device. This can be unlike other types of remote installations, which can require user interaction at a master computer to control installation on a slave computer.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A method, performed by an electronic mobile communication device, to install a computer program onto a computing device that is different than the electronic mobile communication device, the method comprising:
    detecting a connection to the computing device;
    after detecting the connection, determining that the electronic mobile communication device and the computing device are logged into a same user account;
    after detecting the connection, communicating with the computing device to obtain information for use in installing the computer program; and
    executing, on the electronic mobile communication device, an installer for the computer program, the installer using the information from the computing device to install the computer program on the computing device;
    wherein installing the computer program on the computing device comprises installing an executable for the computer program on the computing device, defining directories for the computer program on the computing device, installing files that contain data used by the computer program on the computing device, modifying an operating system on the computing device to support the computer program, and storing configuration file entries on the computing device that define an initial configuration of the computer program on the computing device.

2. The method of claim 1, wherein detecting the connection comprises identifying a communication link between the electronic mobile communication device and the computing device; and
    wherein the installer is executed in response to identification of the communication link.

3. The method of claim 2, wherein the installer is executed automatically, without human intervention, in response to identification of the communication link.

4. The method of claim 2, further comprising:
    providing a query to a user of the computing device as to whether to proceed with installation of the computer program on the computing device; and
    receiving a reply to the query from the user;
    wherein the installer is executed also in response to the reply.

5. The method of claim 4, wherein the query comprises a dialog; and
    wherein the dialog identifies the computing device as a target for installation of the computer program.

6. The method of claim 1, wherein the information identifies the directories for the computer program on the computing device.

7. The method of claim 1, wherein the computer program comprises a companion program to a program that executes on the electronic mobile communication device.

8. The method of claim 1, wherein the computer program comprises a program to manage and play music files.

9. The method of claim 1, wherein the computer program comprises an update to an existing computer program on the computing device.

10. The method of claim 1, wherein the computer program comprises a phone-centric information management computer program.

11. The method of claim 1, further comprising:
    performing a security check on the computer program before installing the computer program on the computing device.

12. The method of claim 1, wherein the installer is part of an installation file; and
    wherein the installation file is not copied to the computing device.

13. A method, performed by an electronic mobile communication device, to install a computer program on a computing device that is separate from the electronic mobile communication device, the method comprising:
    detecting a connection to the computing device;
    after detecting the connection, determining that the electronic mobile communication device and the computing device are logged into a same user account;
    in response to determining that the electronic mobile communication device and the computing device are logged into a same user account, communicating with the computing device to obtain a location on the computing device to which to send an installation file for installing the computer program on the computing device;
    automatically sending the installation file to the location on the computing device, the installation file being sent to a directory at the location identified by the computing device, the computer program being a companion to another computer program that executes on the electronic mobile communication device; and
    sending an instruction to the computing device to execute the installation file on the computing device.

14. The method of claim 13, further comprising:
    performing a security check on the computer program before sending the installation file to the computing device.

15. The method of claim 13, further comprising:
    displaying an indication, on the electronic mobile computing device, that the installation file is being sent to the computing device.

16. One or more machine-readable storage media storing instructions that are executable by an electronic mobile communication device to install a computer program onto a computing device that is different than the electronic mobile communication device, the instructions for performing operations comprising:
    detecting a connection to the computing device;
    after detecting the connection, determining that the electronic mobile communication device and the computing device are logged into a same user account;
    after detecting the connection, communicating with the computing device to obtain information for use in installing the computer program; and
    executing, on the electronic mobile communication device, an installer for the computer program, the installer using the information from the computing device to install the computer program on the computing device;
    wherein installing the computer program on the computing device comprises installing an executable for the computer program on the computing device, defining directories for the computer program on the computing device installing files that contain data used by the computer program on the computing device, modifying an operating system on the computing device to support the computer program, and storing configuration file entries on the computing device that define an initial configuration of the computer program on the computing device.

17. The one or more machine-readable storage media of claim 16, wherein detecting the connection comprises identifying a communication link between the electronic mobile communication device and the computing device; and
wherein the installer is executed in response to identification of the communication link.

18. The one or more machine-readable storage media of claim 17, wherein the installer is executed automatically, without human intervention, in response to identification of the communication link.

19. The one or more machine-readable storage media of claim 17, wherein the operations comprise:
providing a query to a user of the computing device as to whether to proceed with installation of the computer program on the computing device; and
receiving a reply to the query from the user;
wherein the installer is executed also in response to the reply.

20. One or more machine-readable storage media storing instructions that are executable by an electronic mobile communication device to install a computer program on a computing device that is separate from the electronic mobile communication device, the instructions for performing operations comprising:
detecting a connection to the computing device;
after detecting the connection, determining that the electronic mobile communication device and the computing device are logged into a same user account;
in response to determining that the electronic mobile communication device and the computing device are logged into a same user account, communicating with the computing device to obtain a location on the computing device to which to send an installation file for installing the computer program on the computing device;
automatically sending the installation file to the location on the computing device, the installation file being sent to a directory at the location identified by the computing device, the computer program being a companion to another computer program that executes on the electronic mobile communication device; and
sending an instruction to the computing device to execute the installation file on the computing device.

21. The one or more machine-readable storage media of claim 20, wherein the operations further comprise:
performing a security check on the computer program before sending the installation file to the computing device.

22. The one or more machine-readable storage media of claim 20, wherein the operations further comprise:
displaying an indication, on the electronic mobile computing device, that the installation file is being sent to the computing device.

23. An electronic system comprising:
a computing device; and
an electronic mobile communication device that is separate from the computing device, and that is configured to perform the following operations:
detecting a connection to the computing device;
after detecting the connection, determining that the electronic mobile communication device and the computing device are logged into a same user account;
after detecting the connection, communicating with the computing device to obtain information for use in installing the computer program; and
executing, on the electronic mobile communication device, an installer for the computer program, the installer using the information from the computing device to install the computer program on the computing device;
wherein installing the computer program on the computing device comprises installing an executable for the computer program on the computing device, defining directories for the computer program on the computing device, installing files that contain data used by the computer program on the computing device, modifying an operating system on the computing device to support the computer program, and storing configuration file entries on the computing device that define an initial configuration of the computer program on the computing device.

24. The electronic system of claim 23, wherein detecting the connection comprises identifying a communication link between the electronic mobile communication device and the computing device; and
wherein the installer is executed in response to identification of the communication link.

25. The electronic system of claim 24, wherein the installer is executed automatically, without human intervention, in response to identification of the communication link.

26. The electronic system of claim 24, wherein the operations comprise:
providing a query to a user of the computing device as to whether to proceed with installation of the computer program on the computing device; and
receiving a reply to the query from the user;
wherein the installer is executed also in response to the reply.

27. An electronic system comprising:
a first computing device; and
a second computing device;
wherein the first computing device is configured to perform the following operations:
detecting a connection to the second computing device;
after detecting the connection, determining that the first computing device and the second computing device are logged into a same user account;
in response to determining that the first computing device and the second computing device are logged into a same user account, communicating with the second computing device to obtain a location on the second computing device to which to send an installation file for installing the computer program on the second computing device;
automatically sending the installation file to the location on the second computing device the installation file being sent to a directory at the location identified by the second computing device, the computer program being companion to another computer program that executes on the first computing device; and
sending an instruction to the second computing device to execute the installation file on the second computing device.

28. The electronic system of claim 27, further comprising:
performing a security check on the computer program before sending the installation file to the second computing device.

29. The electronic system of claim 27, further comprising:
displaying an indication, on the first computing device, that the installation file is being sent to the second computing device.

30. An electronic mobile communication device configured to install a computer program onto a computing device that is different than the electronic mobile communication device, the electronic mobile communication device comprising:

an interface over which to communicate with the computing device to obtain information for use in installing the computer program; and means for performing the following operations:

detecting a connection to the computing device;

after detecting the connection, determining that the electronic mobile communication device and the computing device are logged into a same user account;

after detecting the connection, communicating with the computing device to obtain information for use in installing the computer program; and executing, on the electronic mobile communication device, an installer for the computer program, the installer using the information from the computing device to install the computer program on the computing device;

wherein installing the computer program on the computing device comprises installing an executable for the computer program on the computing device, defining directories for the computer program on the computing device, installing files that contain data used by the computer program on the computing device, modifying an operating system on the computing device to support the computer program, and storing configuration file entries on the computing device that define an initial configuration of the computer program on the computing device.

31. An electronic mobile communication device configured to install a computer program on a computing device that is separate from the electronic mobile communication device, the electronic mobile communication device comprising:

an interface over which to establish a communication link to the computing device; and means for performing the following operations:

detecting a connection to the computing device;

after detecting the connection, determining that the electronic mobile communication device and the computing device are logged into a same user account;

in response to determining that the electronic mobile communication device and the computing device are logged into a same user account, communicating with the computing device to obtain a location on the computing device to which to send an installation file for installing the computer program on the computing device;

automatically sending the installation file to the location on the computing device, the installation file being sent to a directory at the location identified by the computing device, the computer program being a companion to another computer program that executes on the electronic mobile communication device; and sending an instruction to the computing device to execute the installation file on the computing device.

* * * * *

UNITED STATES PATENT AND TRADEMARK OFFICE
CERTIFICATE OF CORRECTION

PATENT NO. : 8,261,261 B2
APPLICATION NO. : 12/913967
DATED : September 4, 2012
INVENTOR(S) : Erick Tseng It is certified that error appears in the above-identified patent and that said Letters Patent is hereby corrected as shown below:

Column 14, Line 64, delete "device" and insert -- device, --, therefor.

Column 16, Line 52, delete "device" and insert -- device, --, therefor.

Column 16, Line 55, delete "being" and insert -- being a --, therefor.

Signed and Sealed this
Nineteenth Day of February, 2013

Teresa Stanek Rea
*Acting Director of the United States Patent and Trademark Office*